(12) United States Patent
Liston et al.

(10) Patent No.: US 6,308,915 B1
(45) Date of Patent: *Oct. 30, 2001

(54) DETACHABLE INTEGRAL AIRCRAFT TAILCONE AND POWER ASSEMBLY

(75) Inventors: Laurence D. N. Liston, Gilbert; Joseph L. Schoepf, Phoenix, both of AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,608

(22) Filed: Dec. 7, 1999

Related U.S. Application Data

(62) Division of application No. 08/892,647, filed on Jul. 15, 1997, now Pat. No. 6,039,287.
(60) Provisional application No. 60/023,080, filed on Aug. 2, 1996, and provisional application No. 60/023,202, filed on Aug. 5, 1996.

(51) Int. Cl.[7] .................................................. B64D 27/00
(52) U.S. Cl. ............................ 244/54; 244/55; 244/120; 244/248; 244/554
(58) Field of Search ............................... 244/54, 55, 120; 248/554

(56) References Cited

U.S. PATENT DOCUMENTS 2,504,422    4/1950   Johnson ................... 244/54
6,039,287 *  3/2000   Liston et al. .............. 244/54

FOREIGN PATENT DOCUMENTS 1 212 875 A    11/1970   (GB) .
91 08379 A     6/1991    (WO) .

OTHER PUBLICATIONS

European Search Report dated May, 23, 2000.

* cited by examiner

Primary Examiner—J. Woodrow Eldred
(74) Attorney, Agent, or Firm—Robert Desmond, Esq.

(57) ABSTRACT

The present invention provides a tailcone and power assembly mountable to the body of an aircraft using a height adjustable dolly. The tailcone assembly comprises a longitudinal support member, a gas turbine engine mounted to the support member; a firewall; two curved rotatable casings hingeably connected to the support member; an inlet duct extending from an aperture in one of the rotatable casings to the engine inlet; an integral exhaust casing, and interface means for making necessary engine accessory connections to the aircraft. The tailcone is installed on the aircraft by mounting the tailcone in the adjustable dolly, rolling the dolly up to the aircraft, adjusting the dolly until the auxiliary power assembly is properly aligned for attachment to the aircraft, connecting the engine accessories to the aircraft, and bolting the assembly to the aircraft.

11 Claims, 3 Drawing Sheets

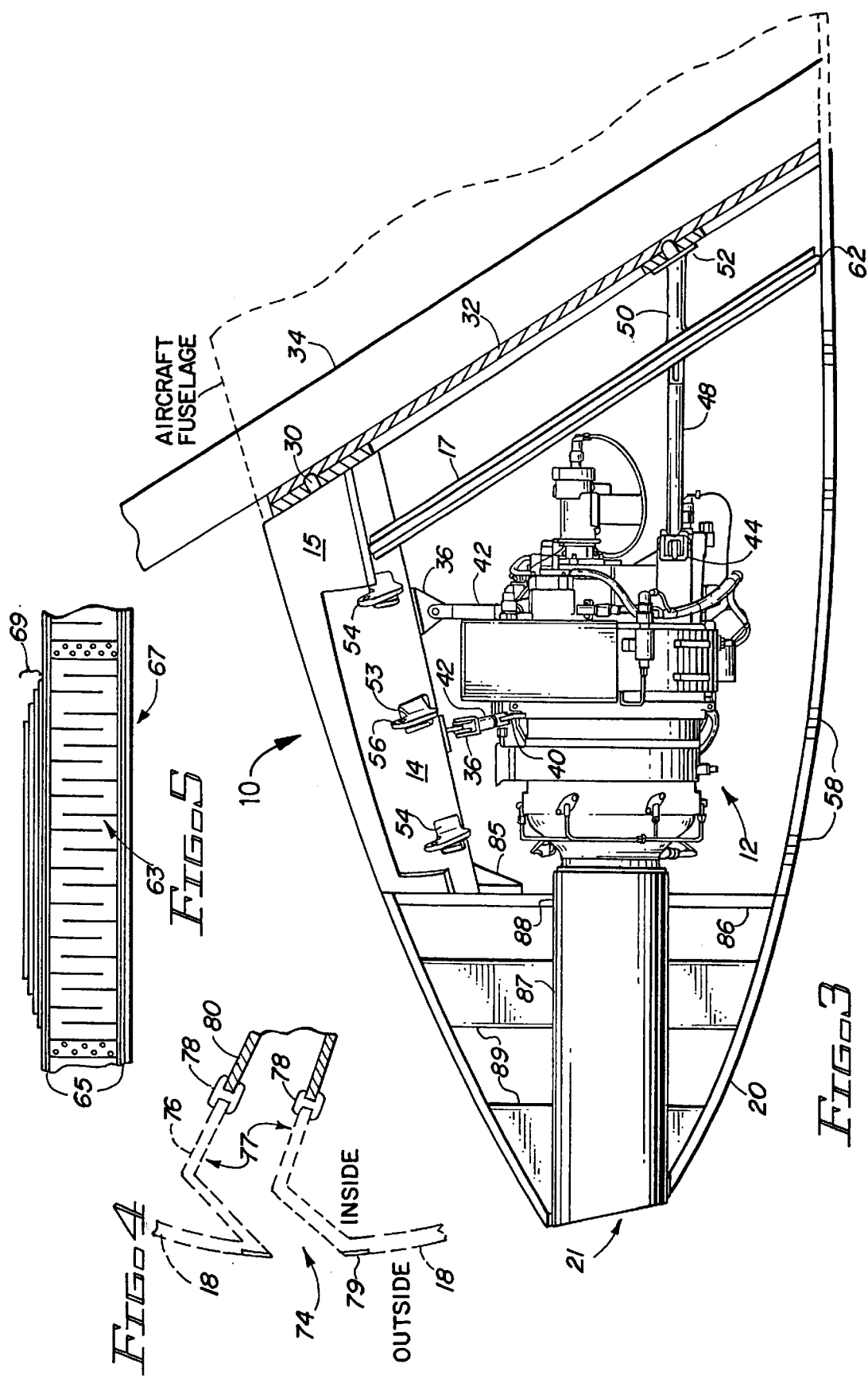

DETACHABLE INTEGRAL AIRCRAFT TAILCONE AND POWER ASSEMBLY

REFERENCE TO COPENDING APPLICATION

This is a division of application Ser. No. 08/892,647, filed Jul. 15, 1997 now U.S. Pat. No. 6,039,287, which claims the benefit of U.S. Provisional Application Nos. 60/023,080 filed Aug. 02, 1996, and 60/023,202 filed Aug. 05, 1996.

TECHNICAL FIELD

This invention relates generally to an aircraft tailcone. More particularly, the present invention relates to a detachable integral aircraft tailcone and power unit assembly configured for quick attachment to and removal from an aircraft.

BACKGROUND OF THE INVENTION

Modem turboprop and turbofan powered aircraft carry a gas turbine engine known as an auxiliary power unit (APU) in addition to the main propulsion engines. The APU serves two main functions: to provide power to aircraft systems when the main engines are not running, and to enable starting the main engines without need for external power. In many business class aircraft and in aircraft used by smaller regional airlines, the APU is mounted in the tail end of the fuselage generally known as the tailcone. Typically, the engine supplier and tailcone casing supplier coordinate with the aircraft manufacturer in the installation of the APU at the manufacturer's facility. The APU is custom fit and mounted to the aircraft, and all accessories such as electrical, pneumatic, and fuel, are routed to the APU and connected. The tailcone casing supplier then fits and installs the casing, usually including an openable or removable panel for access to portions of the APU.

A problem with this kind of APU installation is the large amount of the time and expense involved in completing an installation. The mounting of the APU and routing and connection of accessories requires substantial effort by skilled technicians and engineers from the aircraft manufacturer and APU supplier. Fitting and attaching the casing requires technical support from the tailcone casing supplier as well. A complete installation can take days or even weeks at the aircraft manufacturers facility resulting in substantial cost and inconvenience.

Another problem results from inaccessibility of the APU once the casing is in place. Typically the casing comprises two large panels that are attached to one another and to the aircraft using numerous screws. The casing includes at least one small openable door for providing access to routinely monitored items such as the oil sight glass. However, for anything beyond the routine day to day maintenance it becomes necessary to remove at least one of the large casing panels. Removal of just the screws holding the panels together can take thirty minutes or longer. The time spent on removing and reinstalling the tailcone casing can become particularly inconvenient and costly when it results in unplanned delay to scheduled flights.

Accordingly, a need exists for a system that substantially reduces the time and labor required to install and test an APU and tailcone casing onto an aircraft. Another need exists for a tailcone casing that provides quick access to the entire APU mounted therein.

SUMMARY OF THE INVENTION

In view of the above, it is an object for this invention to provide a system that substantially reduces the time and labor required to install an APU and tailcone casing onto an aircraft, and to provide a tailcone casing giving quick access to the entire APU mounted within.

The present invention achieves these objects by providing a detachable integral aircraft tailcone and power assembly mountable to the body of an aircraft using a height adjustable dolly. The tailcone assembly comprises a longitudinal support member having forward and aft axial ends; a gas turbine engine mounted within the tailcone to the support member; a firewall extending from the support member forward of the engine; two curved rotatable casings hingeably connected to the support member and rotatable from a closed position to an open position thereby exposing the engine, the open position being at least 90 degrees from the closed position; an inlet duct extending from an aperture in one of the rotatable casings to the engine inlet; and interface means for making necessary electrical, mechanical, pneumatic, and hydraulic accessory connections between said tailcone assembly and said aircraft body. The forward axial end of the support member includes a flange adapted for quickly and rigidly attaching the entire tailcone assembly to the aircraft body. The integral aircraft tailcone may also include an integrated exhaust muffler.

The tailcone assembly is installed on the aircraft by mounting the tailcone in the adjustable dolly, rolling the dolly up to the aircraft, adjusting the dolly until the tailcone assembly is properly aligned for attachment to the aircraft, connecting the engine accessories to the aircraft, and bolting the tailcone to the aircraft.

These and other objects, features and advantages of the present invention are specifically set forth in or will become apparent from the following detailed description of a preferred embodiment of the invention when read in conjunction with the accompanying drawings.

BRIEF DESCRIPTION OF THE DRAWINGS

FIGS. 1A–1B depicts an enlarged fragmented cross-sectional view of an encircled portion of FIG. 1.

FIG. 3 depicts a partially cross sectional partially cutaway side view of the tailcone assembly contemplated by the present invention.

FIG. 4 depicts a fragmented cross-sectional view of the integral inlet duct.

FIG. 5 depicts an enlarged fragmentary sectional view of an encircled portion of FIG. 1.

DESCRIPTION OF THE PREFERRED EMBODIMENT

Figure 1:
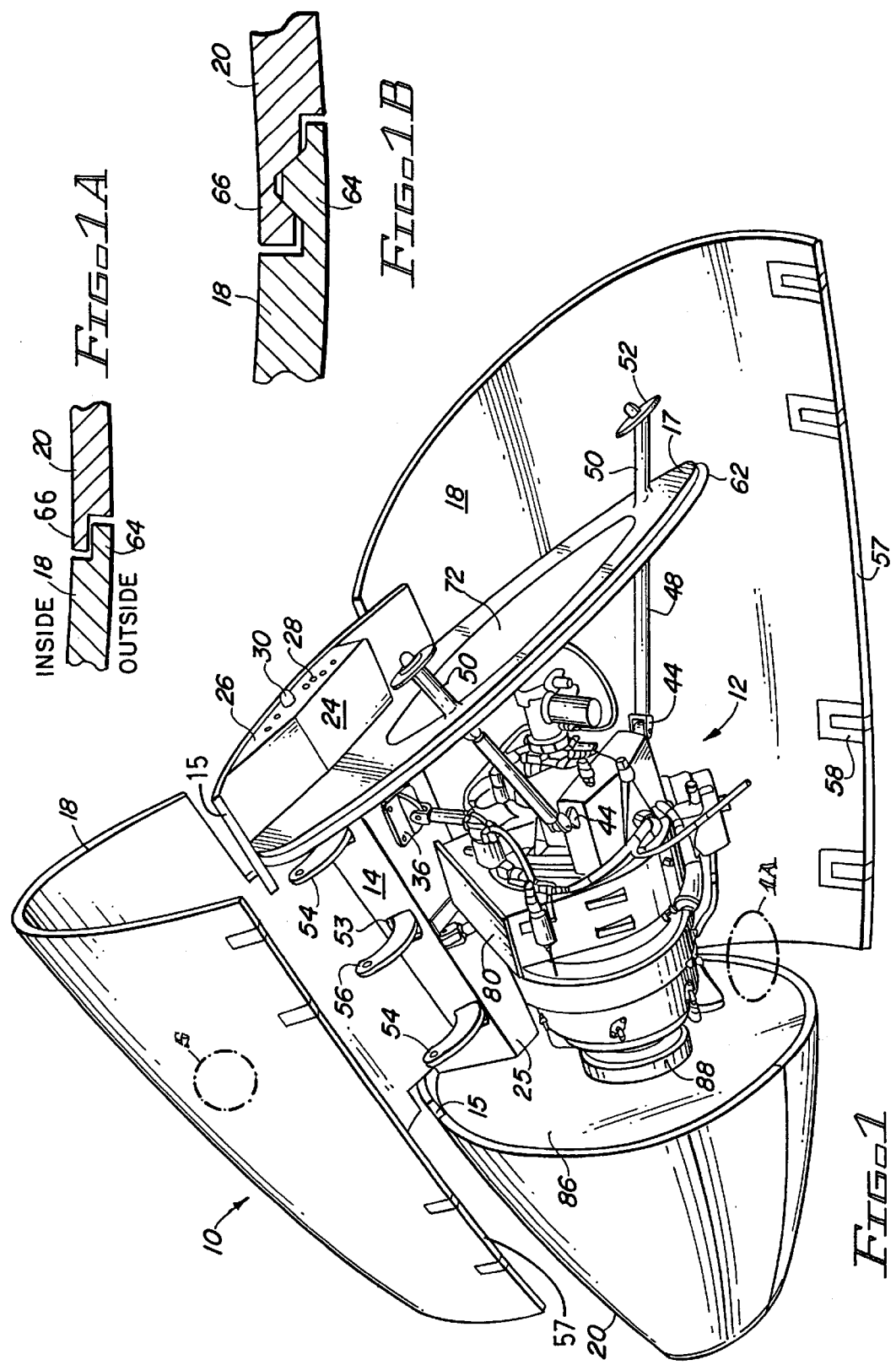
FIG. 1 depicts a perspective view of the tailcone assembly contemplated by the present invention.

The integral tailcone and power assembly of the subject invention is indicated generally by the numeral 10 in FIG. 1. The tailcone assembly 10 comprises generally a gas turbine engine 12 mounted from a support member 14, two rotatable casing halves 18 hingeably mounted to support member 14, a firewall 17, and an integral exhaust cone 20 with an open aft end 21.

Figure 2:
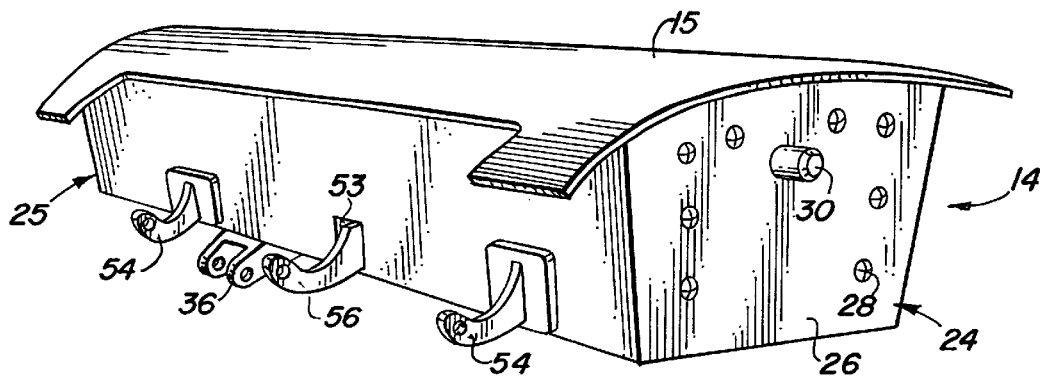
FIG. 2 depicts a perspective view of the support member portion of the tailcone assembly of FIG. 1.

Referring to FIGS. 2 and 3, primary support for the entire tailcone assembly 10 is provided by the support member 14. The support member 14 extends longitudinally from a forward end 25 to an aft end 25. The upper surface of the support member 14 is capped by a fairing 15 contoured to define the top surface of the tailcone between the hinged edges of casing halves 18. The support member structure is thus entirely enclosed within the tailcone 10. Alternatively, the upper surface of the support member 14 may be contoured to define the top surface of the tailcone assembly. The support member construction consists of a welded box or I-beam structure preferably made from Inconel 625 sheet and plate stock. Other constructions or materials may be used depending on the particular installation.

The support member 14 is adapted for attachment to the rear bulkhead 32 and tail spar 34 of the aircraft. The forward end of support member 14 is tapered at an angle to fit the aircraft bulkhead 32, and provided with a flange 26 having bolt holes 28 and a locating pin 30. When the tailcone assembly 10 is installed, the flange 26 is bolted to the aircraft bulkhead 32, and preferably also to the tail spar 34, thereby rigidly connecting the tailcone assembly to the aircraft. The connection is designed so that the support member 14 extends roughly horizontally from the aircraft.

The support member 14 further includes mounting brackets 36 for connecting to the gas turbine engine main mounts. The engine depicted in the figures has forward and rear main mount pads indicated as 38 and 40 respectively, both located on the top side of the engine. Main mounts 38 and 40 are connected to the mounting brackets 36 through rigid links 42. It should be noted that the locations and orientations of the engine's main mounts and the support member mounting brackets 36 shown are illustrative of a typical configuration. The present invention more broadly contemplates mounting any suitable engine to a support member 14 regardless of how the engine mounts may be configured.

The engine 12 also includes two secondary mounts 44. The secondary mounts 44 are connected to the firewall 17 (described below) via struts 48. Opposite each of the struts 48, standoffs 50 extend from the firewall 17 to the aircraft. A flange 52 having an alignment pin and bolt holes is defined at the forward end of each standoff 50 for attachment to the aircraft bulkhead 32. The struts 48 and standoffs 50 are preferably configured to provide a direct load path between the secondary mounts 44 and the aircraft bulkhead 32. As with the main mounts, the location and orientation of the secondary mounts shown is merely illustrative of a typical installation, and not limiting to the mount configurations contemplated by the invention described and claimed herein.

Fire protection and access to the engine's accessories are provided by the firewall 17. The firewall 17 is rigidly connected to the support member 14 several inches rearward of flange 26, and preferably parallel with the aircraft rear bulkhead 32. A bulb seal 62 is attached to the perimeter of the firewall 17 for sealing off the engine from the aircraft. The seal 62 is itself protected by a seal retainer (not shown) extending from the firewall 17. When the rotatable casing halves 18 are closed and latched together, the seal 62 is compressed and mates with a seal land (not shown) located on each casing 18. An access panel 72 is provided in firewall 17 for routing the engine's accessory connections out of the tailcone assembly 10. All engine accessory connections may be advantageously made in the cavity between the firewall 17 and the aircraft bulkhead 32.

The rotatable casings 18 enclose almost the entire forward portion of the tailcone assembly 10. Each casing 18 extends longitudinally from the forward end of the tailcone rearward to a point approximately adjacent the engine exhaust, and wraps circumferentially all the way around to the bottom of the tailcone, abutting one another along their lower longitudinal edges 57. Four spaced apart latches 58 are used along the lower longitudinal edges 57 to latch the casings 18 to one another. Additional latches on the forward and aft edges of the rotable casings may be used to provide additional support. Preferably latches 58 are flush with the outer surface of the casings 18 when closed and latched.

The rotatable casings 18 provide access to the entire APU for performing various engine maintenance by opening one or both sides. The casings 18 are large enough to allow for removal of the APU from the aircraft when required, such as for performing a hot section overhaul, without need for removal of any casing from the aircraft. The aft edges of the casings 18 are undercut to define a lip 64 which overlays a mating step 66 in the forward edge of the exhaust cone 20, as illustrated in FIG. 1A, thereby creating a lap joint arrangement when the rotatable casings are closed and latched. A similar undercut is provided in the forward edge of the casings 18 for overlaying the perimeter of the aircraft bulkhead 32.

The rotatable casings 18 are hingeably connected to gooseneck hinges 54 and 56 extending from support member 14. The forward and aft gooseneck hinges 54 are rigidly attached to the sides of support member 14. A single piece floating hinge 56 is disposed between fixed hinges 54, and defines the center gooseneck hinge for both casing halves 18. The floating hinge 56 comprises a single bar formed into the goosenecks at each end, free to slide laterally and vertically in a slot 53 formed in the support member 14. The floating hinge 56 self aligns with the fixed hinges 54, thereby ensuring free movement of the casing 18, and enabling alignment of casings 18 to be controlled solely by adjustment of fixed hinges 54. Alternative hinging arrangements, for example strip piano type hinges, may be used instead of the gooseneck type depending upon the constraints of the installation.

The rotatable casings 18, are preferably made of a composite skinned honeycomb sandwich construction as shown in FIG. 5. The core material in the sandwich construction is a honeycomb structure 63 typically made of either Titanium metal or Phenolic—a paper based material. The inner and outer exterior surfaces 65 of the sandwich are made of a carbon fiber reinforced plastic (CFRP). The CFRP consists of carbon fiber and a plastic matrix, where the plastic matrix may be an epoxy, bismaleimide, or polyimide; the latter having higher temperature capability. If an epoxy based CFRP is used, a thermal blanket may be required to shield the doors from engine heat. Such a thermal blanket would typically be made from woven "Teflon" or "Capton" material, and pinned to the inside of the rotatable casings. The outer external surface includes layers of copper foil or nickel mesh 67 for lightning protection. Kevlar plies may be added to the inside surface of the casings 18, a higher density honeycomb core used adjacent the turbine and compressor wheels of the gas turbine engine for improved fragment containment. The rotatable casings 18 may alternatively be made of a suitable sheet metal, such as 0.040 inch thick Titanium 6AL-4V with stringer reinforcement. Casings made of Titanium or other metal do not require the addition of copper foil for lightning protection.

The tailcone assembly 10 includes means for ducting combustion air to the engine, illustrated in FIG. 4. One of the rotatable casings 18 includes an inlet aperture 74 aligned with an integral inlet conduit or duct 76 extending from the inside surface of the casing 18 to an open end adjacent the engine inlet 80. The inlet conduit 76 includes a gasket 78 at its open end such that when the casings 18 are closed and latched, inlet conduit 76 sealingly mates up with the engine inlet 80, thereby defining a duct from the engine inlet to the ambient air. Inlet conduit 76 is integral with casing 18 and preferably constructed of the same type of honeycomb composite material.

The inner surfaces of the conduit 76 receive an acoustic treatment for suppressing engine noise. The treatment comprises perforating the entire inner composite surface of the honeycomb composite with a plurality of small diameter (approximately 1/16 inch) closely spaced holes 77. Noise abatement may alternatively be achieved by incorporating a wire mesh layer known in the industry as a septum (not shown) into the honeycomb composite structure. The septum may be disposed between the inner composite surface and the honeycomb, or between two layers of honeycomb. A suitable louvered cover plate or activated door 79 for directing air into the ducting and filtering out foreign objects is located over aperture 74. The cover plate 79 may include means for restricting the amount of airflow entering the conduit such as through adjustable louvers or multiple positioned door.

Referring to FIG. 3, the aft most portion of the tailcone is an integral exhaust cone 20 rigidly mounted to the aft end of support member 14 by a bracket 85. The outer surface of the exhaust cone 20 defines the exterior surface of the tailcone aft of the casings 18. The exhaust cone structure comprises a tapered hollow shell, with an open aft end 21 and a bulkhead 86 at the forward end. The bulkhead 86 defines an aperture 88 adapted for sealingly connecting the exhaust cone 20 to the engine exhaust. Preferably the exhaust cone 20 is constructed of the same type of light weight honeycomb composite as the rotatable casings 18, namely either epoxy Bismaleimide or Polyimide matrix CFRP covering a honeycomb core; or alternatively a more conventional Titanium sheet and stringer construction.

Once attached to the engine exhaust, the exhaust cone 20 functions as a conduit for porting exhaust gas out of the tailcone assembly 10, taking the place of a conventional tail pipe. The exhaust cone 20 also includes means for suppressing exhaust noise such as a felt metal facesheet 87 and felt metal baffles 89. Importantly, the exhaust cone 20 acts as the activating door for the muffler, thereby providing an integrated muffler and exhaust cone.

Figure 6B:
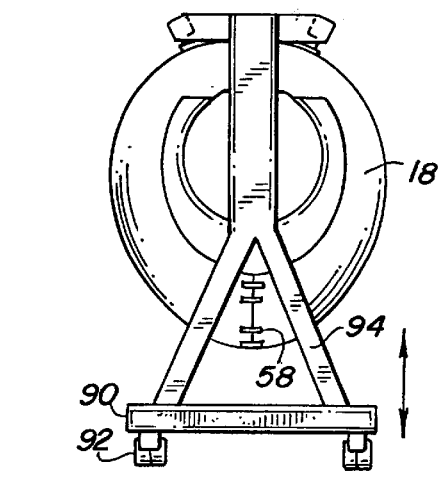
FIG. 6B depicts an aft looking forward view of the tailcone assembly and installation dolly of FIG. 6A.
Figure 6A:
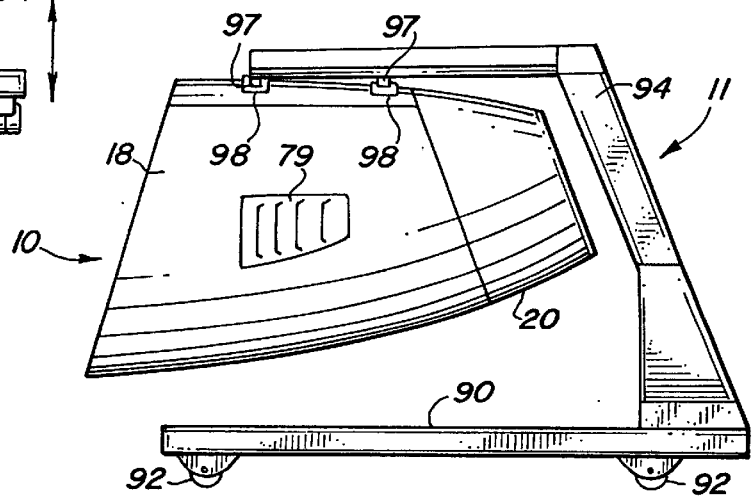
FIG. 6A depicts a side view of an integral tailcone and power assembly mounted in an installation dolly as contemplated by the present invention.
Figure 6C:
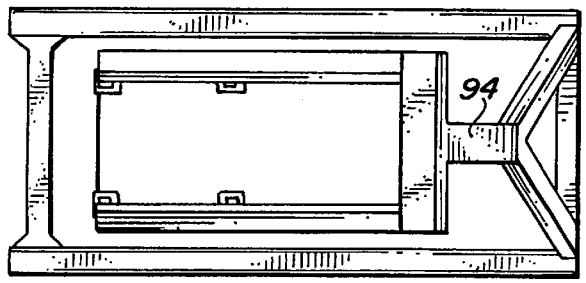
FIG. 6C depicts a top looking down view of the tailcone assembly and installation dolly of FIG. 6A.

An adjustable height dolly 11, shown in FIGS. 6A through 6C facilitates installation and removal of the tailcone assembly 10 from aircraft. The dolly or cart 11 includes a base portion 90 having steerable adjustable height wheels 92, and a frame portion 94 extending vertically from and overhanging the base portion. The frame portion 94 includes fittings 97 for suspending the tailcone assembly 10 from suspension points 98 located on the top of the tailcone.

With the tailcone mounted in the dolly 11, the dolly may be rolled up to the rear bulkhead of the aircraft for installation. Any required fine adjustments in mounting alignment are made by adjusting the height of wheels 92. Alternatively, any other suitable system for final height and angle adjustment of the tailcone assembly 10 may be used, such as adjustable height frame 94 or adjustable fittings 97 thereon.

When adequately positioned and aligned, the engine's accessory connections are made and the tailcone 10 is bolted to the aircraft.

Various modifications and alterations of the above described detachable integral aircraft tailcone and power assembly will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. An aircraft tailcone assembly comprising:
   a longitudinal support member having forward and aft axial ends;
   a gas turbine engine mounted within said tailcone to said support member, said engine having an inlet and an exhaust;
   a firewall extending from said support member forward of said engine;
   at least one curved rotatable casing hingeably connected to said support member and rotatable from a closed position to an open position thereby exposing said engine;
   an inlet duct extending from an aperture in one of said rotatable casings to said engine inlet;
   interface means for making necessary electrical, mechanical, pneumatic, and hydraulic accessory connections between said tailcone assembly and said aircraft body; and
   a flange at said forward axial end of said support member adapted for quickly and rigidly attaching the entire tailcone assembly to said aircraft body.

2. The tailcone assembly of claim 1, wherein said fittings for attaching the forward end of said support member to said aircraft body comprise a flange drilled for mount bolts, and a shear pin extending from said flange for facilitating alignment with said aircraft body.

3. The tailcone assembly of claim 2, further comprising:
   stabilizing struts connecting secondary mounts of said gas turbine engine to said firewall; and
   standoffs opposite said stabilizing struts between said firewall and said aircraft body, said standoffs adapted for attachment to said aircraft body.

4. The tailcone assembly of claim 1, wherein two of said rotatable casings are hingeably mounted along their longitudinal upper edges to said support member, said casings extending longitudinally from the forward end of said tailcone assembly, rearward to a point roughly adjacent the aft end of said engine, and extending circumferentially to the bottom of said tailcone assembly so as to abut one another along their lower longitudinal edges.

5. The tailcone assembly of claim 4, wherein each of said rotatable casings are hingeably mounted to said support member with at least two gooseneck hinges.

6. The tailcone assembly of claim 5, wherein said rotatable casings have at least two latches disposed along their longitudinal lower edges for latching the casings to one another.

7. The tailcone assembly of claim 1, wherein said inlet duct comprises:
   a perforated cover plate mounted over said aperture in said rotatable casing;

an integral conduit aligned with said aperture and extending from the inner surface of said rotatable casing to an open end adjacent said engine inlet;

gasket attached to said open conduit end configured to sealingly connect said conduit to said engine inlet upon rotating said casing to the closed position.

8. The tailcone assembly of claim 7, wherein said integral conduit is acoustically treated to suppress engine noise.

9. The tailcone assembly of claim 1, wherein said rotatable casings are made of a honeycomb composite comprising a honeycomb core and fiber reinforced composite layers overlaying said honeycomb core.

10. The tailcone assembly of claim 9, wherein said fiber reinforced composite layers comprise carbon fiber reinforcement and a plastic matrix, said plastic matrix selected from a group consisting of epoxy, bismaleimide, and polyimide plastics.

11. The tailcone assembly of claim 9, wherein the inner surfaces of said rotatable casings further include Kevlar reinforcement layers overlaying said reinforced composite layers for improved fragment containment.

* * * * *